United States Patent [19]
Sarantakis et al.

[11] 3,862,925
[45] Jan. 28, 1975

[54] PREPARATION OF SOMATOTROPIN RELEASE INHIBITING FACTOR AND INTERMEDIATES THEREFOR

[75] Inventors: Dimitrios Sarantakis, Audubon; Wayne A. McKinley, Wallingford, both of Pa.

[73] Assignee: American Home Products Corporation, New York, N.Y.

[22] Filed: July 5, 1973

[21] Appl. No.: 376,472

[52] U.S. Cl. .............................. 260/112.5, 424/177
[51] Int. Cl... C07c 103/52, C07g 7/00, A61k 27/00
[58] Field of Search ................................. 260/112.5

[56] References Cited
OTHER PUBLICATIONS

Vale et al., C. R. Acad. Sc. Paris, Ser. D, 275, 2913–2916, (1972).
Rivier et al., C. R. Acad. Sc. Paris, Ser. D, 276, 2737–2740, (1973).
Brazeau et al., Science, 179, 77–79, (1973).
Pettit; George R., "Synthetic Peptides," Vol. I, Van Nostrand, Rheinhold Co., N.Y., 1970, pp. 5–6.
Brazeau et al., Chem. Abstr., 78: 79972k, (1973).

*Primary Examiner*—Lewis Gotts
*Assistant Examiner*—Reginald J. Suyat
*Attorney, Agent, or Firm*—Richard K. Jackson

[57] ABSTRACT

Somatotropin release inhibiting factor (SRIF) presenting the structure:

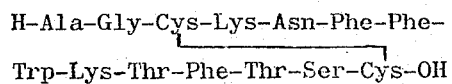

is prepared by fragment condensation without racemization, employing dehydrative coupling techniques. The novel intermediate polypeptides, useful in the preparation of the tetradecapeptide, are described.

31 Claims, No Drawings

PREPARATION OF SOMATOTROPIN RELEASE INHIBITING FACTOR AND INTERMEDIATES THEREFOR

BACKGROUND OF THE INVENTION

It is known that crude hypothalamic preparations will inhibit the secretion of the growth hormone, somatotropin. Recently, the structure of a somatotropin-release-inhibiting-factor (SRIF) has been elucidated by Brazeau et al., Science, 179, 77 (1973) as

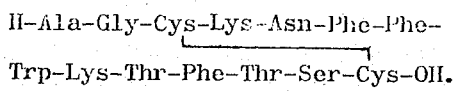

DESCRIPTION OF THE INVENTION

In accordance with this invention, applicants provide a process for the production of a somatotropin-release-inhibiting-factor (SRIF) of the formula:

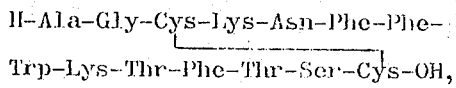

which comprises:
a. coupling Ra-Thr(Ro) with Ser(Ro)-ORe by the dehydrative coupling method followed by removal of the carboxyl protecting group Re,
b. dehydrative coupling of Ra-Thr(Ro)-Ser(Ro)-OH with Cys(SRs)-ORe.HA salt followed by removal of the alpha-amino protecting group of Thr;
c. dehydrative coupling of the product of step (b) with Ra-Thr(Ro)-Phe-OH and thereafter removing the alpha-amino protecting group of Thr;
d. dehydrative coupling of the product of step (c) with Ra-Phe-Phe-Irp-Lys(Ra$^\epsilon$) OH followed by removal of the alpha-amino protecting of Phe;
e. coupling the product of step (d) with Ra—Asn—ORl in the presence of a catalytic amount of an acid followed by removal of the alpha-amino protecting group;
f. dehydrative coupling of the product of step (e) with Ra—Ala—Gly—Cys(SRs)—Lys(Ra$^\epsilon$)—OH to yield the fully protected tetradecapeptide Ra—Ala—Gly—Cys(SRs)—Lys(Ra$^\epsilon$)-Asn-Phe-Trp-Lys(Ra$^\epsilon$)-Thr(Ro)-Phe-Thr—(Ro)-Ser(Ro)-Cys(SRs)—ORe;
g. deprotecting the product of step (f) by acid cleavage; and
h. oxidizing the product of step (g) to obtain the cyclic disulfide.

In the preceding paragraph, the protecting groups are designated Ra — alpha-amino protecting group; Ro — hydroxy protecting group or hydrogen; Re — carboxy protecting group; Rs — mercaptan protecting group; Ra$^\epsilon$—epsilon amino protecting group of Lysine and HA is an addition salt of cysteine. The group Rl represents a leaving group of asparagine.

The α-amino protecting groups contemplated by Ra are those known to be useful in the art in the step-wise synthesis of polypeptides. The selection of an α-amino protecting group throughout the synthesis should fulfill the following requirements (a) retain its protecting properties (i.e. not be split off under coupling conditions), (b) not give rise to side reactions or otherwise interfere in the synthesis and (c) be readily and selectively removable so that other protecting groups from the same or other functional groups can be retained (i.e. not split off) where desired during the synthesis. Among the classes of α-amino protecting groups are (1) acyl type protecting groups illustrated by the following: formyl, trifluoroacetyl, phthalyl, toluenesulfonyl (tosyl), benzenesulfonyl, o—, p— or 2,4-dinitrophenylsulfenyl, tritylsulfenyl, o-nitrophenoxyacetyl, chloroacetyl, acetyl, γ-chlorobutyryl, etc.; (2) aromatic urethan type protecting groups illustrated by benzyloxycarbonyl and substituted benzyloxycarbonyl such as p-chlorobenzyloxycarbonyl, p-nitrobenzyloxycarbonyl, p-bromobenzyloxycarbonyl, p-methoxybenzyloxy-carbonyl, 2-(p-biphenyl)isopropoxycarbonyl, diphenylmethoxycarbonyl, (3) aliphatic urethan protecting groups illustrated by tert-butyloxycarbonyl, diisopropylmethoxycarbonyl, isopropyloxycarbonyl, ethoxycarbonyl, allyloxycarbonyl; (4) cycloalkyl urethan type protecting groups illustrated by cyclopentyloxycarbonyl, adamantyloxycarbonyl, cyclohexyloxycarbonyl, (5) thio urethan type protecting groups such as phenylthiocarbonyl; (6) aralkyl type protecting groups as illustrated by triphenylmethyl (trityl), benzyl; (7) trialkylsilane groups such as trimethylsilane.

The preferred α-amino protecting groups defined by Ra are selected from the class consisting of tert-butyloxycarbonyl, trityl, phthalyl, tosyl, allyloxycarbonyl, cyclopentyloxycarbonyl, tert-amyloxycarbonyl, and aromatic urethan type groups of the formula:

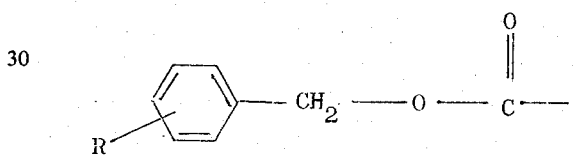

wherein:
R is selected from the class consisting of hydrogen, halo, lower alkoxy or nitro; preferably R is hydrogen.

The groups designated Ro may be hydrogen, or a hydroxyl protecting group such as acetyl, tosyl, benzoyl, tertiary butyl, trityl, benzyl, p-methoxybenzyl, and the like, while the most preferred blocking group is benzyl. It is not essential to the success of the process that the hydroxyl groups be protected, although it is preferred. Thus, at any stage in the overall process, the protecting groups Ro may be removed to obtain the free hydroxy containing products. The carboxyl groups may be protected by the group Re which is stable under the conditions used to deprotect the α-amino group and may be selected from the class consisting of straight chain $C_1$–$C_6$ lower alkyl (e.g. methyl, ethyl, butyl, tert-butyl, pentyl), benzyl, substituted benzyl wherein the substituent is selected from at least one of nitro, methoxy and methyl (e.g. p-methoxy-benzyl, p-nitrobenzyl, 2,4-dimethoxybenzyl, 2,4,6-trimethylbenzyl, pentamethylbenzyl), phenacyl, phthalimidomethyl, β-methylthioethyl, 4-picolyl, diphenylmethyl and 4-(methylthio)-phenyl). Preferably Re is lower alkyl, benzyl or substituted benzyl.

The sulfhydryl group of cysteine may be protected (Rs) by benzoyl, trityl, benzyl, p-methoxybenzyl, benzyloxycarbonyl, p-nitrobenzyl, acetamidomethyl, diphenylmethyl or nuclear substituted diphenylmethyl in which the substituents are alkoxy of 1 to 6 carbon atoms, chloro, iodo, bromo, and the like. The preferred sulfhydryl blocking group is p-methoxybenzyl.

The epsilon nitrogen atom of lysine may be protected by the groups Ra which is any group conventionally employed to mask an amino group, including those protecting groups presented in the description of Ra, supra, and preferably the benzyloxycarbonyl group.

The acid addition salt HA, employed in the coupling of Cys(Srs)—O(Re) with Ra—Thr(Ro)—Ser(-Ro)—OH may be any salt conventionally employed in the art. The tosylate salt is preferred in this step of the process of this invention.

The leaving group Rl, employed in coupling asparagine, is any good leaving group such as 3-chlorophenyl, penta-chlorophenyl, N—hydroxysuccinimide, N-hydroxyphthalimide, p-nitrophenyl, and the like, the p-nitrophenyl group being preferred.

The mixed anhydride method of coupling, a specific form of dehydrative coupling, was employed in joining Ra—Thr(Ro) with Ser(Ro)—O(Re) in step (a) of the above-described procedure this procedure includes the formation of those reactive mixed anhydrides well known in peptide synthesis derived from such reagents as 1-adamantylchloroformate, isobutyl chloroformate, diphenylketene, diphenylphosphorochloridate, ethyl chloroformate, trimethylacetyl chloride, and the like, isobutyl chloroformate being the preferred reagent. The reaction is conducted in an inert organic solvent at a temperature from −40° to about 5°C.

The dehydrative coupling method generally employed in the above described procedure includes in the use of such reagents as N,N'-carbonyldiimidazole, N,N'-carbonyl-s-triazine, 1-cyclohexyl-3-(2-morpholinomethyl)-carbodiimide, dicyclohexylcarbodiimide, diethyl chlorophosphite, diethyl chlorophosphonite, diethylcyanamide, diethyl ethylenepyrophosphite, tetraethyl pyrophosphite, N-(3-dimethylaminopropyl)-N-'-ethylcarbodiimide hydrochloride, diphenylketene p-tolylimine, ethoxyacetylene, and N-ethyl-5-phenylisoxazolium-3'-sulfonate, alone, or in combination with one of the following N-hydroxy amines, if desired, N-hydroxypyridine, N-hydroxyphthalimide, N-hydroxypiperidine, N-hydroxysuccinimide, phenylphosphorodi-(1-imidazolate), and the like. The preferred methods employ N,N'-dicyclohexylcarbodiimide and N-hydroxysuccinimide or N-hydroxybenzotriazole. The reaction is conducted in an inert organic solvent at a temperature from −40° to about 40°C.

The specific reaction scheme which minimizes racemization and affords a high yield of pure SRIF may be summarized as follows:

BOC—Thr(Bzl)—Ser(Bzl)—OH was coupled with Cys(SMBl)—OBzl 0 TosOH salt by the DCC/N-hydroxybenzotriazole method to give BOC—Thr(Bzl)—Ser(Bzl)—Cys(SMBzl)—OBzl which was treated with TFA/anisole to afford Thr(Bzl)—Ser(Bzl)—(SMBzl)-OBzl.TFA salt.

BOC-Thr(Bzl)-Phe-OH was joined with the product of the preceding paragraph by the DCC/N-hydroxysuccinimide method to yield BOC-Thr(Bzl)-Phe-Thr(Bzl)-Ser(Bzl)-Cys(SMBzl)-OBzl which was treated with TFA/anisole to give Thr-(Bzl)-Phe-Thr(Bzl)-Ser-(Bzl)-Cys(SMBzl)-OBzl which was coupled with Boc-Phe-Phe-Trp-Lys-(Cbz)-OH by the DCC/N-hydroxysuccinimide method to afford -Phe-Phe-Trp-Lys(Cbz)-Thr(Bzl)-Phe-Thr(Bzl)-Ser(Bxl)-Cys(SMBzl)-OBzl. This nonapeptide was treated with TFA/anisole to give Phe-Phe-Trp-Lys(Cbz)-Thr-(Bzl)-Phe-Thr(Bzl)-Ser(Bzl)-Cys(SMBzl)-OBzl.TFA salt.

BOC-Asn-ONP(p-nitrophenyl ester) was reacted with the product of the preceding paagraph in the presence of a catalytic amount of glacial acetic acid to afford BOC-Asn-Phe-Phe-Trp-Lys(Cbzl)-Thr(Bzl)-Phe-Thr(Bzl)-Ser(Bzl)-Cys(SMBzl)-OBzl which was treated with TFA/anisole to give Asn-Phe-Phe-Trp-Lys(Cbz)-Thr-(Bzl)-Phe-Thr(Bzl)-Ser(Bzl)-Cys(SMBzl)-OBzl.TFA salt.

The tetrapeptide BOC-Ala-Gly-Cys(SMBzl)-Lys(Cbz)-OH was combined with the salt prepared in the preceding paragraph by the DCC/N-hydroxysuccinimide method to yield the fully protected tetradecapeptide BOC-Ala-Gly-Cys-(SMBzl)-Lys(Cbz)-Asn-Phe-Phe-Trp-Lys(Cbz)-Thr(Bzl)-Phe-Thr(Bzl)-Ser(Bzl)-Cys(SMBzl)-Obzl which was deprotected by liquid HF in the presence of anisole to afford Ala-Gly-Cys(SH)-Lys-Asn-Phe-Phe-Trp-Lys-Thr-Phe-Thr-Ser-Cys(SH)OH. The linear tetradecapeptide peptide was purified by gel filtration and then oxidized by air at pH 7.5 to give the tetradecapeptide sulfide.

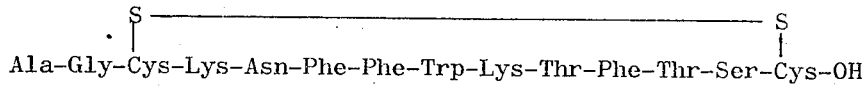

Ala-Gly-Cys-Lys-Asn-Phe-Phe-Trp-Lys-Thr-Phe-Thr-Ser-Cys-OH which was purified by partition chromatography and gel filtration through Sephadex G-25.

Thus, the process of this invention may be illustrated with reference to the preferred protecting groups and coupling techniques by the following reaction scheme:

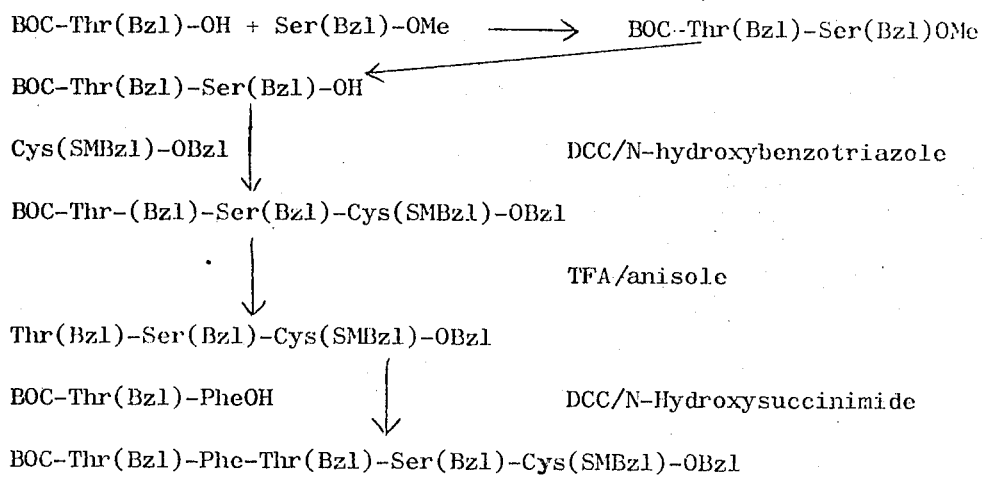

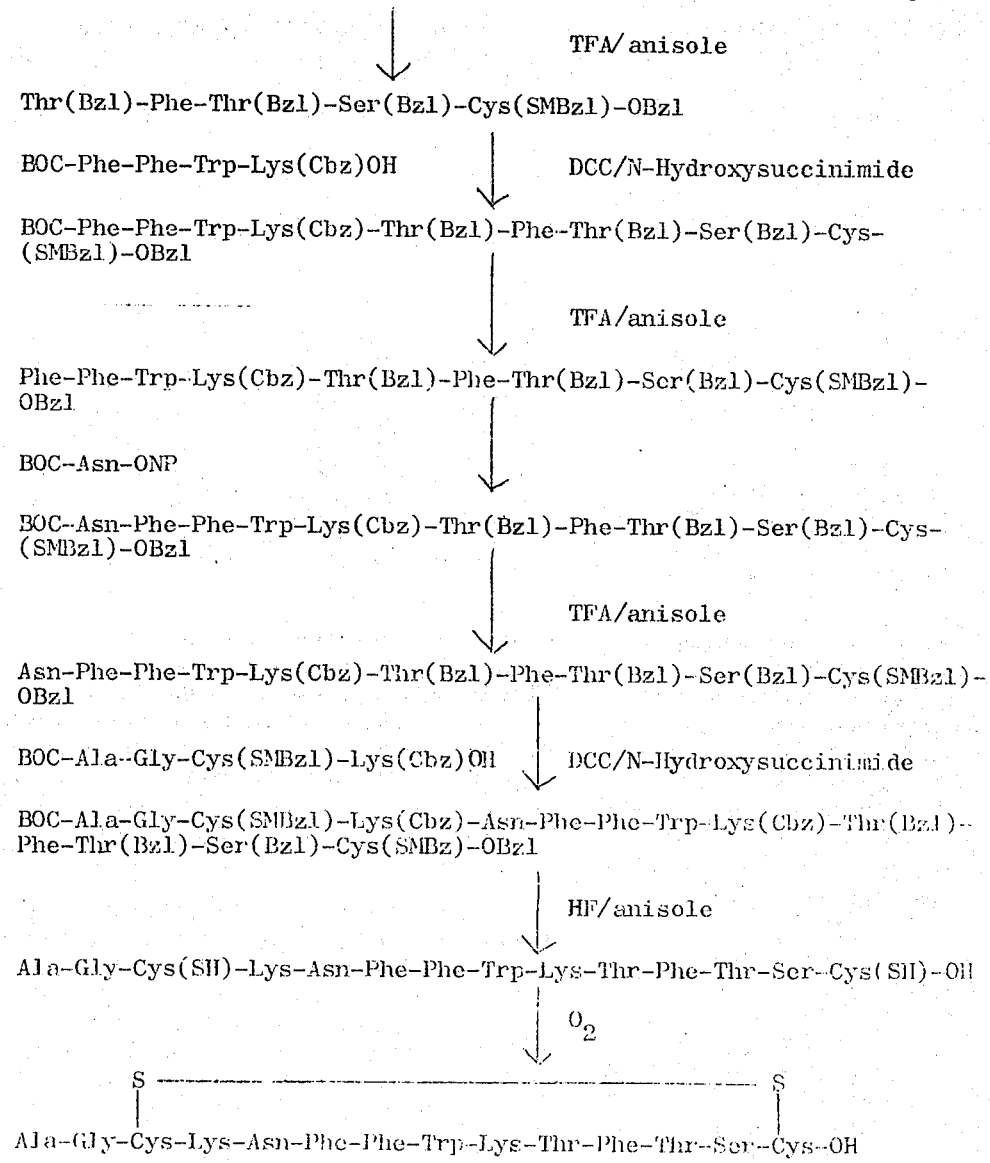

As may be seen from the forgoing description of the invention, asparagine was added by the p-nitrophenyl ester method in order to avoid dehydration of the side chain amide function to β-cyanoalanine. In this reaction, the acid catalyst may be any organic carboxylic acid known to the art for coupling amino acids containing a carbamyl group, such as acetic, propionic, benzoic, oxalic and similar acids.

The ε-amino groups of the two lysines were protected by the benzyloxycarbonyl (Cbz) group while the tert-butyloxycarbonyl (BOC) moiety masked the α-amino group of the N-terminal alanine. Benzyl ethers (Bzl) and benzyl esters (OBzl) were employed for the protection of the side chains of serine and threonine and the carboxyl grup of C-terminal cysteine respectively, while the p-methoxy benzyl group (MBzl) served for the protection of the sulfhydryl side chain functions of the two cysteines. The initial coupling of Thr-Ser-OH with cysteine was performed with the latter amino acid in the acid addition salt form HA.

The removal of the BOC group during the elongation of the peptide chain was carried out by trifluoroacetic acid (TFA) in the presence of excess anisole as a scavenger of the cationic species, while the deprotection of the fully protected tetradecapeptide was accomplished by treatment with anhydrous liquid hydrogen fluoride under controlled conditions and in the presence of anisole. Deprotection of the fully protected tetradecapeptide can also be performed solely with sodium in liquid ammonia, except when BOC is present in the N-terminal alanine, which group must first be removed by acid cleavage.

The deprotected linear tetradecapeptide was oxidized by standing for three days in the air and under high dilution (100 mg/l) in an $CH_3COONH_4$ (0.1 M) buffer solution. The crude product was purified by gel filtration through Sephadex G-25 and elution with 2N-acetic acid then by partition chromatography on Sephadex G-25 in n-butanol-acetic acid-water (4:1:5).

The fully blocked and the terminal free carboxylic acid intermediates, produced by the process of this invention, which applicants regard as part of their inventive contribution are:

I. 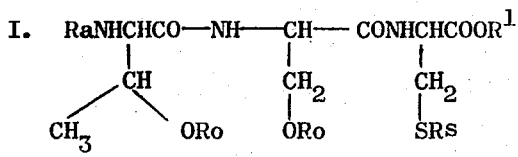
Ra-Thr(Ro)-Ser(Ro)-Cys(SRs)-OR¹
II. 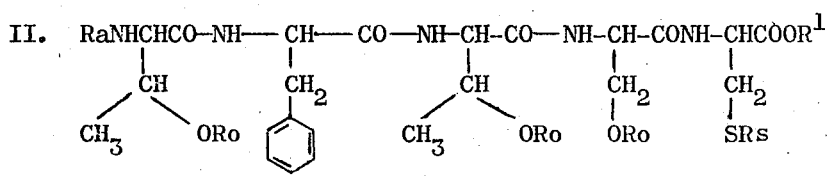
Ra-Thr(Ro)-Phe-Thr(Ro)-Ser(Ro)-Cys(SRs)-OR¹
III. 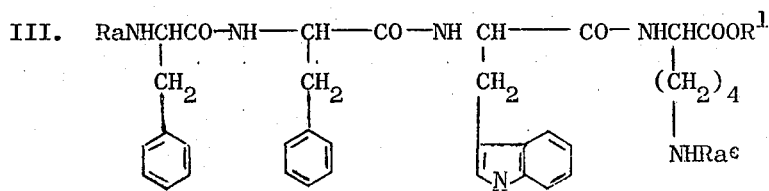
RaPhe-Phe-Trp-Lys(Raᵋ)OR¹
IV. 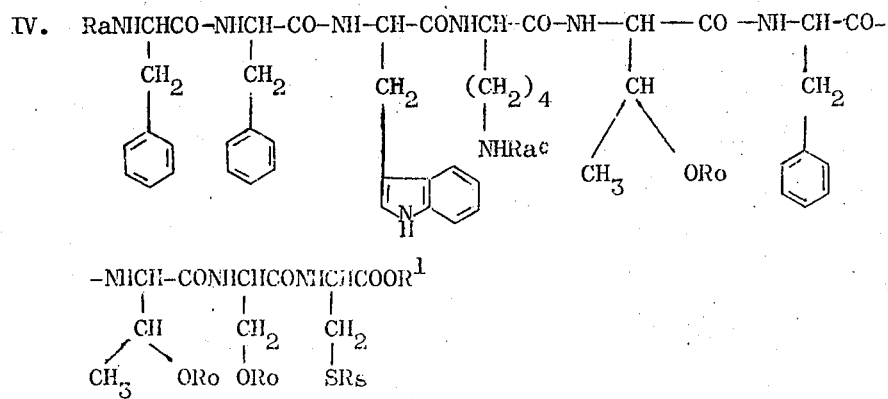
Ra-Phe-Phe-Trp-Lys(Raᵋ)-Thr(Ro)-Phe-Thr(Ro)-Ser(Ro)-Cys(SRs)-OR¹
V. 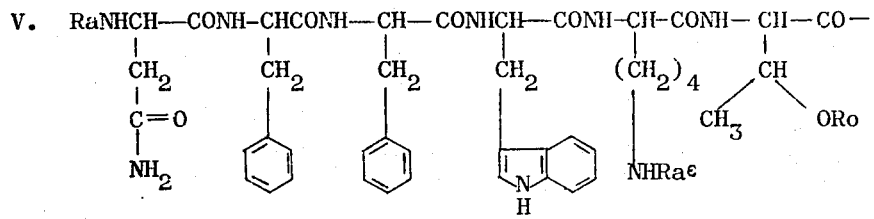
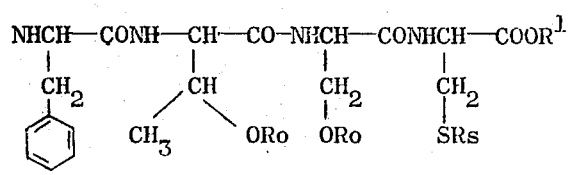
Ra-Asn-Phe-Phe-Trp-Lys(Raᵋ)-Thr(Ro)-Phe-Thr(Ro)-Ser(Ro)-Cys(SRs)-OR¹

VI. 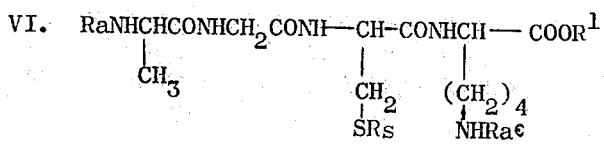

Ra-Ala-Gly-Cys(SRs)-Lys(Ra$^\varepsilon$)-OR$^1$

VII. 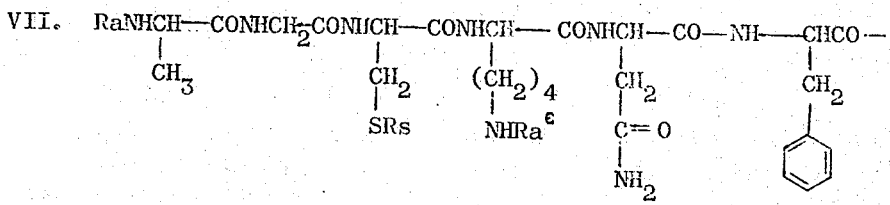

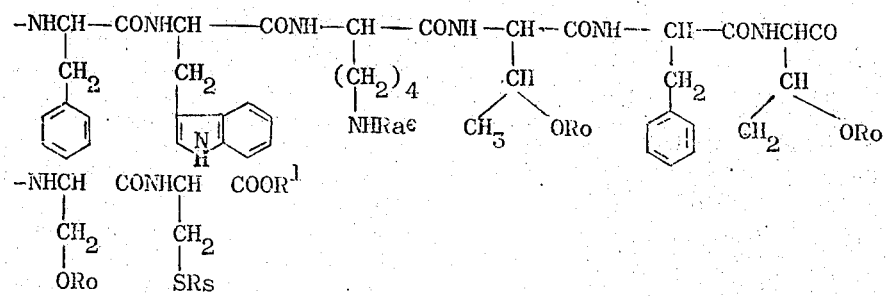

Ra-Ala-Gly-Cys(SRs)-Lys(Ra$^\varepsilon$)-Asn-Phe-Phe-Trp-Lys(Ra$^\varepsilon$)-

Thr(Ro)-Phe-Thr(Ro)-Ser(Ro)-Cys(SRs)-OR$^1$

The groups Ra, Ra$^\varepsilon$, Ro, Rs are defined supra, in the description of the process aspect of the invention.

and the group R$^1$ represents either the above defined protecting group Re or hydrogen.

The inhibition of somatotropin release by the tetradecapeptide produced via the process of this invention was established by the procedure of Vale et. al., Endocrinology, 91, 562 (1972) and Grant et. al., Biochem. Biophys. Res. Commun., 51, 100 (1973).

Therefore, the tetradecapeptide SRIF is useful in the prevention of excessive secretion of somatotropin in domestic animals and for control of the immunoreactive pituitary growth hormone in comparative and experimental pharmacology. Furthermore, the known relationship between growth hormone control in standard experimental animals and the human, characterizes SRIF as a useful compound in the treatment of acromegaly. Administration of SRIF may be conducted by conventional routes common to other polypeptides. The tetradecapeptide is active in inhibiting the release of somatotropin in the picogram per milliliter dose range, with maximum potency in vitro of about $2.5 \times 10^{-9}$ grams per milliliter.

In the following examples which illustrate the preferred route for the production of somatotropin, examples 1–3 are directed toward the preparation of fragments used elsewhere in the examples for the construction of the tetradecapeptide.

Throughout the examples, the abbreviations used are:

THF - tetrahydrofuran
DMF - dimethylformamide
MeOH - methanol
DCC - dicyclohexylcarbodiimide
DCU - dicyclohexylurea
TLC - thin layer chromatography
TFA - trifluoroacetic acid The yield of each product is presented as a per cent of theory.

EXAMPLE I t-Butyloxycarbonyl-L-alanylglycyl-S-methoxybenzyl-L-cysteinyl-N$^\varepsilon$-benzyloxycarbonyl-L-lysine.
-benzyloxycarbonyl-L-lysine.
N-t-Butyloxycarbonyl-L-alanylglycine benzyl ester.

To a solution of t-BOC-L-Ala (18.9 g. 0.1 mole) and N-methylmorpholine (11.2 ml, 0.1 moles) in THF (100 ml) at −20°C. was added iso-butyl chloroformate (13.1 ml, 0.1 moles) being careful to keep the temperature below −15°C. After 15 minutes, a cold DMF solution of Gly-OBzl-p-tolsylate (33.7 g. 0.1 mole) which had been adjusted to pH 7.5 by the addition of N-methylmorpholine (11.2 ml, 0.1 mole) was added, and the temperature allowed to rise to 0°C. The stirring was continued at 0°C. for 2 hours, then at ambient temperature overnight. The filtered reaction solution was concentrated in vacuo, the residue taken up in ethyl acetate, and washed consecutively with KHSO$_4$ (5%), KHCO$_3$ (5 percent), and saline. After drying over Na$_2$SO$_4$, the solution was concentrated in vacuo to a solid. Recrystallized by taking up in hot ethyl acetate/diethyl ether (1:10) and adding hexane to cloud; obtained a white crystalline solid, 29.7 g (88 percent). m.p. 87°–90°C. [α]$_D^{26}$ = −27.98 (c 1.037, MeOH); R$_f$ (chloroform-methanol, 25:1) 0.67; UV and I$_2$ positive Elemental Analysis for C$_{17}$H$_{24}$N$_2$O$_5$ (336.38)

Calc'd: C 60.70, H 7.19, N 8.33
Found: C 60.51, H 7.45, N 8.42

N-t-Butyloxycarbonyl-L-alanylglycine.

t-BOC-L-Ala-Gly-OBzl (29 g, 86 m moles) was dissolved in MeOH (50 ml) and N sodium hydroxide (87 ml) was added. After 3 hours at ambient temperature, N-hydrochloric acid is added to adjust the solution to pH 6.5; the solution is then concentrated in vacuo to a small volume, water added (200 ml), cooled in an ice bath and adjusted to pH 3 with N-hydrochloric acid. An oil precipitates and rapidly crystallizes; it is filtered and washed with water, then dried in vacuo over KOH leaving a white solid, 16.1 g (76 percent). m.p. 108°–111°C. $[\alpha]_D^{26} = -25.65$ (c 0.976 MeOH); Rf (n-butanol-water-acetic acid, 4:1:1) 0.78, $I_2$ and chlorine peptide spray positive.

Elemental Analysis for $C_{10}H_{18}N_2O_5 \cdot 1\ H_2O$ (264.28)
  Calc'd: C 45.44, H 7.63, N 10.60
  Found: C 44.88, H 8.11, N 10.62 t-Butyloxycarbonyl-L-alanylglycyl-S-methoxybenzyl-L-cysteine benzyl ester.

A DMF solution of L-Cys (SMBzl)-OBzl p-tosylate (32.7 g. 65 m moles) was carefully adjusted to pH 7 with triethylamine (ca. 9.0 ml, 65 m moles). t-BOC-L-Ala-Gly-OH (16 g, 65 m moles) was added to the solution and it was cooled to 0°C. DCC was added and the stirred mixture was kept at 0°C. for 2 hours, and then at ambient temperature for 18 hours. The filtered reaction solution was concentrated in vacuo, and residue taken up in ethyl acetate. After filtering off more DCU, the ethyl acetate solution was washed consecutively with N citric acid, $KHCO_3$ (5 percent), and water, and dried over $Na_2SO_4$. On concentrating in vacuo an oil was obtained, which was crystallized from methanol diethyl ether to give a white solid, 25.4 g (70 percent). m.p. 126°–127°C. $[\alpha]_D^{26} = -43.93$ (C 0.982, MeOH); $R_f$ (chloroform-methanol, 25:1) 0.35, UV and $I_2$ positive.

Anal. Calc. for $C_{28}H_{37}N_3O_7S$ (559.60) C 60.09, H 6.66, N 7.51.
  Found: C 60.88, H 7.17, N 7.86.

t-Butyloxycarbonyl-L-alanylglycyl-S-methoxybenzyl-L-cysteine.

t-BOC-l-Ala-Gly-L-Cys(SMBzl)-OBzl (12.0 g, 21.4 m moles) was dissolved in methanol-dioxane (100 ml, 3:1). Added N sodium hydroxide (23 ml) and left at ambient temperature for 3 hours. After adjusting to pH 6.5 with N-hydrochloric acid, the solution was concentrated in vacuo to a small volume, water added (100 ml), cooled in an ice bath, and acidified to pH 3 with N-hydrochloric acid. The oil which precipitated was extracted into ethyl acetate and washed with saline, then dried over $Na_2SO_4$ and concentrated in vacuo to an oil. The oil was crystallized from ethyl acetate-diethyl ether-n-pentane to give a white solid, 9.2 g (92 percent). m.p. 112°–120°C.; $[\alpha]_D^{26} = -25.60$ (C 0.967, MeOH); $R_f$ (n-butanol-water-acetic acid, 4:1:1) 0.72, UV and chlorine peptide spray positive.

Anal Calc. for $C_{21}H_{31}N_3O_7S$ (469.5) C 53.72, H 6.66, N 8.95.
  Found: C 54.79, H 6.97, N 8.97.

t-Butyloxycarbonyl-L-alanyglycyl-L-methoxybenzyl-L-cysteinyl-N$^\epsilon$-benzyloxycarbonyl-L-lysine methyl ester.

A DMF solution of t-BOC-L-Ala-Gly-L-Cys(SMBzl)-OH (8.45 g. 18 m moles) and N-hydroxysuccinimide (2.07 g. 18 m moles) was cooled to 0°C. Then DCC (3.92 g, 19 m moles) was added and the mixture stirred for 15 minutes. A cool DMF solution of L-Lys(N$^\epsilon$ Cbz)-OMe hydrochloride (5.93 g. 18 moles) which had been adjusted to pH 7 with triethylamine (2.50 ml, 18 m moles) was then added, and the mixture stirred at 0°C. for two hours and at ambient temperature overnight. The filtered reaction solution was concentrated in vacuo, and the residue taken up in ethyl acetate. After washing consecutively with $KHSO_4$ (5 percent), and saline, and drying over $Na_2SO_4$, the solution was concentrated in vacuo to an oil. The oil was taken up in ethyl acetate and a slightly gelatinous solid precipitated with diethyl ether -n-pentane. Recrystallized from ethyl acetate diethyl ether-n-pentane, 10 g (75%). m.p. 78°–81°C.; $[\alpha]_D^{26} = -31.55$ (c 1.006, MeOH): $R_f$ chloroform-methanol, 9:1) 0.90, UV and $I_2$ positive.

Anal. Calc. for $C_{36}H_{51}N_5O_{10}S$ (745.89) C 57.97, H 6.89 N 9.39.
  Found: C 56.87, H 7.06 N 9.06.

t-Butyloxycarbonyl-L-alanylglycyl-S-methoxybenzyl-L-cysteinyl-N$^\epsilon$-benzyloxycarbonyl-L-lysine.

t-BOC-L-Ala-Gly-L-Cys(SMBzl)-L-Lys(N$^\epsilon$Cbz)-OMe (10 g, 13.4 m moles) was dissolved in methanol (40 l ml) and N sodium hydroxide (14 ml) added. After three hours at ambient temperature, the solution was neutralized with N-hydrochloric acid, and concentrated in vacuo to a small volume. The residue was taken up in water (100 ml), cooled in an ice bath, and acidified to pH 3 with N-hydrochloric acid. The white solid which precipitated was filtered off and washed with water, then dried in vacuo over KOH. Recrystallization from ethyl acetate diethyl ether gave a slightly gelatinous white solid, 7.50 g (77 percent). A second crop of equal purity was obtained on adding n-pentane to the above mother liquor, 1.26 g (13%) [total yield 8.76 g (90 percent)]. m.p. 85°–90°C.; $[\alpha]_D^{25}$ −26 (C 1.05, methanol); $R_f$ (n-butanol-water-acetic acid, 4:1:1) 0.90, UV and chlorine peptide spray positive.

Anal. Calc. for $C_{35}H_{49}N_5SO_{10}\ H_2O$ (749.9) C 56.07 H 6.85 N 9.34
  Found: C 56.10 H 6.91 N 9.37

Amino Acid Anal. Ala 1.00, Gly 1.00, Cys. 0.61, Lys 1.01

EXAMPLE II

N-tert-Butyloxycarbonyl-L-Phenylalanyl-L-Phenylalanyl-L-Tryptophyl-N Benzyloxycarbonyl-L-Lysine.

N-tert-Butyloxycarbonyl-L-Phenylalanyl-Phenylalanine Methyl Ester

BOC-Phe-OH (53 gr, 0.2 moles) was dissolved in a mixture of THF-DMF (1:1) (500 ml), mixed with N-methylmorpholine (22 ml) and cooled at −15°C, then isobutylchloroformate (27 ml) was added under stirring. The reaction mixture was stirred for 7 minutes and then a solution of PheOMe.HCl(44 gr, 0.2 moles) and N-methylmorpholine (22 l ml) in DMF (300 ml) was added and the mixture was allowed to reach room temperature overnight.

The triethylamine hydrochloride salt which separated was filtered out and the filtrate was evaporated to a small volume. The residue was treated with an excess of water to give an oily compound which crystallized after 30 minutes. The crystalline solid was washed on the filter with 5 percent $KHSO_4$, water, 5 percent $KHCO_3$, water and dried to afford a solid, 80 gr (96%) m.p. 166°–168°C. $R_f$ (EtOAc-Hexane, 1:1) 0.90

N-tert-Butyloxycarbonyl-L-Phenylalanyl-L-Phenylalanine.

BOC-Phe-Phe-OMe (122 gr, 0.29 moles) was dissolved in methanol-dioxane-acetone (ca 1000 ml, 1:1:1) and treated with 1 N sodium hydroxide solution for 3 hours. The basic solution was neutralized with dilute hydrochloric acid (ph 7 ) and then most of the organic solvent was removed in vacuo. The residue was diluted with water and acidified with 5% KHSO$_4$ aqueous, to afford a crystalline solid which was washed with water and dried, 73 gr (62 percent) m.p. 93°–95°C dec.
Elemental Analysis for C$_{23}$H$_{28}$N$_2$O$_5$ (412)
  Calcd: C 66.99, H 6.80, N 6,80
  Found: C 66.62, H 6.68, N 6.78

N-tert-Butyloxycarbonyl-L-Phenylalanyl-L-Phenylelanyl-L-tryptophan Methyl Ester.

BOC-Phe-Phe-OH (41.2 gr, 0.1 moles) was dissolved in DMF-THF (250 ml, 1:1) and mixed with N-hydroxysuccinimide (14 gr), then Trp-OMe·HCl (25.45 gr, 0.1 moles) and triethylamine (13.9 ml). The mixture was cooled in an ice bath and treated with DCC (21 gr, 0.12 moles) for 2 hours in the ice-bath then overnight at room temperature. The DCU which separated was filtered off and the filtrate to half concentrated to half its volume then an excess of water was added to afford a gummy solid which was taken in EtOAc and washed with 5% KHSO$_4$, water, 5% KHCO$_3$, water, dried over Na$_2$SO$_4$ and evaporated to dryness. The residue was solidified from EtOAc-Et$_2$O-Hexane, then from Hexane, to afford a powder, 57 gr (93%) a R$_f$ EtOAc-Heptone 0.55 and an impurity at 0.05.

A portion of this material (10 gr) was chromatographed through a column of silica gel (4.5 × 55 cm) and eluted with EtOAc-Hexane (1:1) to give a white solid, 6.4 gr (64 percent) chromatographically homogeneous m.p. 113°–116°C dec.
Elemental Analysis for C$_{35}$H$_{40}$N$_4$O$_6$ (612.7)
  Calcd: C 68.61, H 6.58 N 9.15
  Found: C 68.74 H 6.79 N 9.32

N-tert-Butyloxycarbonyl-L-Phenylalanyl-L-Phenylalanyl-L-Tryptophan

BOC-Phe-Phe-Trp-OMe (5.5 gr, 9 m moles) was dissolved in methanol (25 ml) and treated with 1 N-NaOH (12 ml) for 3 hours at room temperature. The organic solvent was evaporated to a small volume and the residue was diluted with water then acidified with 5% KHSO$_4$ to give a white precipitate which was filtered, washed with water and dried. 5 gr. (93 percent) m.p. 140–142°C. R$_f$ (CHCl$_3$-MeOH-AcOH, 85:10:5) 0.80 trace at 0.05
Elemental Analysis for C$_{34}$H$_{38}$N$_4$O$_6$ · 3H$_2$O (652.6)
  Calcd: C 62.56, H 6.79 N 8.57
  Found: C 62.52. H 6.03, N 8.76

N-tert-Butyloxycarbonyl-L-Phenylalanyl-L-Phenylalanyl-L-Tryptophyl-N$^\epsilon$--Benzyloxycarbonyul-L-Lysine Methyl Ester.

BOC-Phe-Phe-Trp-OH (10 gr, 16.7 m moles) was mixed with Lys(Cbz) OMe · HCl salt (5.6 gr, 17 m moles) in DMF (150 ml) and triethylamine 2.32 ml) was added followed by N-hydroxysuccinimide (2.3 gr). The mixture was cooled in an ice-bath then DCC (4.12 gr) was added under stirring. It was kept for two hours in the ice-bath and for 20 hours at room temperature after which time the DCU which separated was filtered off and the filtrate was treated with an excess of water to precipitate a gummy material. This material was taken in EtOAc and the organic phase was washed with 5 percent citric acid, brine, 5% Na$_2$CO$_3$, brine, and dried over Na$_2$SO$_4$ for a short time then concentrated to a small volume and treated with an excess of Et$_2$O to afford a crystalline solid 11.7 gr (80%) m.p. 159–160°C. R$_f$ (CHCl$_3$-MeOH-AcOH, 85:10:5) 0.75

Anal. Calc. for C$_{49}$H$_{58}$N$_6$O$_9$ (875) C 67.26, H b 6.68, N 9.60
  Found: C 66.39, H 6.63, N 9.63

N-tert-Butyloxycarbonyl-L-Phenylalanyl-L-Phenylalanyl-L-Tryptophyl-N$^\epsilon$--Benzyloxycarbonyl-L-Lysine.

BOC-Phe-Phe-Trp-Lys(Cbz)OMe (8.8 gr, 10 m moles) was dissolved in a mixture of methanol-acetone (150 ml, 1:1) and treated with 1 N-NaOH (12 ml) for 6 hours at room temperature. Acidification with 10 percent citric acid (200 ml) gave a solid which was filtered and washed with water thoroughly, 8.5 gr (99 percent) m.p. 166°–168°C. [α]$_D^{25}$ –8.91 (C 1, DMF) R$_f$ (CHCl$_3$-MeOH, 10:1) 0.30  R$_f$(n-Butanol-water-pyridine-acetic acid 30:24:20:6) 0.90
Anal. Calc. for C$_{48}$H$_{56}$N$_6$O$_9$ (860.9) C 66.69, H 6.56, N 9.76
  Found: C 66.39, H 6.63, N 9.63

EXAMPLE III

N-Tert-Butyloxycarbonyl-O-Benzyl-L-Threonyl-L-Phenylalanine.
N-Tert-Butyloxycarbonyl-O-Benzyl-L-Threonyl-L-Phenylalanine methyl ester.

A solution of BOC-L-Thr(Bzl)-OH (61-8 g, 0.2 moles) and N-methylmorpholine (22.4 ml, 0.2 moles) in THF was cooled to –15°C. Iso-butylchloroformate (26.2 ml, 0.2 moles) was added in portions, keeping the temperature between –15° and –10°C. After stirring at –15°C. for 15 minutes, a cold mixture of L-Phe-Ome · HCl (43.1 g. 0.2 moles) and N-methylmorpholine (22.4 ml, 0.2 moles) in DMF was added in portions keeping the temperature between –10° and –5°C. The mixture was stirred at 0°C. for 2 hours, and then at room temperature overnight. The filtered reaction mixture was concentrated in vacuo, and the residue taken up in ethyl acetate. The ethyl acetate solution was washed consecutively with 5% KHSO$_4$, 5% KHCO 3, saline, and dried over NA$_2$SO$_4$. After concentrating in vacuo an oil was obtained which crystallized on standing. The solid was recrystallized from isopropyl ether - hexane, 74.9 g (80 percent). m.p. 78°–81°C.; [α]$_D^{24}$ + 10.75 (c 1.023, MeOH); R$_f$ (CHCl$_3$) 0.35.
Anal. Calc. for C$_{26}$H$_{34}$N$_2$O$_6$ (470.55) C66.36, H 7.28, N 5.95.
  Found: C66.72, H 7.32, N 5.85.

N-Tert-Butyloxycarbonyl-O-Benzyl-L-Threonine-L-Phenylalanine.

BOC-Thr(Bzl)-Phe-OMe (23.5 gr, 0.05 moles) was dissolved in a mixture of MeOH-dioxane (100 ml, 1:1) and treated with N-NaOH (55 ml) for 3 hours (until starting material cannot be detected by TLC) Most of the solvent was evaporated in vacuo and the residue was diluted with water then it was acidified with 5 percent citric acid. The gum which separated was taken in EtOAc and washed with water (brine) then evaporated to dryness. The residue was crystallized from Et$_2$O-Hexane. 19.8 gr (87 percent) m.p. 118°–119°C.
Rf(chloroform-methanol-glacetic acid, 85:10:5) 0.80

EXAMPLE IV

N-tert-Butyloxycarbonyl-O-benzyl-L-threonyl-O-benzyl-L-serine methyl ester.

N-Tert-butyloxycarbonyl-O-benzyl-L-threonine (30.9 gr, 0.1 mole) was dissolved in dry tetrahydrofuran (200 ml) cooled at –20°C. and treated with N-methylmorpholine (11 ml) followed by isobutylçhloroformate (13.4 ml). The cold reaction mixture was stirred for 5 minutes at –20°C. then treated with a solution of O-benzyl-L-serine, methyl ester, hydrochloride (25 g. ca. 0.1 moles) containing N-methylmorpholine (11 ml), in DME, and the mixture was allowed to reach room temperature overnight.

The solvent was removed in vacuo and the residue was partitioned between water-ethyl acetate. The organic phase was washed with 5 percent citric acid, water, aq. $KHCO_3$, water and dried over $MgSO_4$, then evaporated to dryness to afford an oily residue which crystallized from diethyl ether-hexane to a jelly like solid (29 gr) $R_f$ ($CHCl_3$-MeOH, 25:1) 0.85, $R_f$ (EtOAc-Hexane, 1:1) 0.65

EXAMPLE V

N-tert-Butyloxycarbonyl-O-benzyl-L-threonyl-O-benzyl-L-serine.

BOC-Thr(Bzl)-Ser-(Bzl)-OMe (28.2 gr. 0.0563 moles) was dissolved in methanol (ca. 50 ml) and treated with 1 N sodium hydroxide (75 ml) for 1.5 hours at room temperature. The alkaline solution was neutralized to pH 7 with 10 percent citric acid and most of the methanol was removed in vacuo. The residue was diluted with some water and acidified with 5 percent aq. $KHSO_4$ then extracted with EtOAc. The organic phase was washed with $H_2O$ dried over $N_2SO_4$ and evaporated to dryness to an oil. Yield quantitative. $R_f$(EtOAC-hexane, 1:1) 0.15 (long spot)

EXAMPLE VI

N-tert-Butyloxycarbonyl-0-benzyl-L-threonyl-O-benzyl-L-seryl-S-p-methoxybenzyl-L-cysteine benzyl ester.

BOC-Thr(Bzl)-Ser(Bzl)-OH (24.3 gr, 50 m moles) was dissolved in acetonitrile and dichloromethane (250 ml, 2:3) and was mixed with HCys(SMBzl)OBzl ·TosOH (25 gr. 50 m moles), then with triethylamine (6.8 ml) and N-hydroxybenzotriazole (6.8 gr) and the mixture was cooled in an ice-bath.

A solution of DCC (11 gr, 53 m moles) in acetonitrile (50 ml) was added and the reaction mixture was stirred for two hours in the cold then for 2 days at room temperature. The DCU which separated was filtered off and the filtrate was evaporated to dryness. The oily residue was partitioned between ethyl acetate-water and the organic phase was washed with 10 percent citric acid, water, 5% $KHCO_3$, brine and dried over $Na_2SO_4$. The solvent was evaporated and the oily residue was crystallized from $Et_2O$-hexane to afford a white solid, 24.5 gr m.p. = 87°–90°C. $R_f$ (chloroform-methanol, 25:1) 0.54, traces at 0.4 and 0.3 (heptane-EtOAc, 1:1) 0.64, traces at 0.25, $I_2$ positive $[\alpha]_D^{25}$ −14.7 (C 0.98, DMF)

Elemental Analysis for $C_{44}H_{52}N_3SO_9$ (798.9)
Calcd C 66.15, H 6.56, N 5.26
Found C 66.22, H 6.95, N 5.29

EXAMPLE VII

O-Benzyl-L-Threonyl-O-Benzyl-L-Seryl-S-p-Methoxybenzyl-L-Cysteine Benzyl Ester, Trifluoroacetate.

BOC-Thr(Bzl)-Ser(Bzl)-Cys-(SMBzl)-OBzl (8 gr. 10 m moles) was mixed with anisole (100 m moles) and treated with TFA (100 ml) for 45 minutes. The solvent was evaporated in vacuo and the residue was dissolved in dry $Et_2O$, then evaporated to dryness in high vaccuo to give an oily compound, 7.2 gr (90percent) $R_f$ n-butanol-water-glacial acetic acid, 4:1:1)0.9, $R_f$ (Heptane-EtOAc) 0.0–0.1 long spot, $I_2$ positive and ninhydrin positive.

EXAMPLE VIII

N-tert-Butyloxycarbonyl-O-Benzyl-L-Threonyl-L-Phenylalanyl-O-Benzyl-Threonyl-0-Benzyl-L-Seryl-S-p-Methoxy Benzyl-L-Cysteine Benzyl Ester.

BOC-Thr(Bzl)-Phe-OH (prepared by the method of Example III) (9.2 gr. 20 m moles) was dissolved in DMF (100 ml) and mixed with N-hydroxysuccinimide (3.4 gr) and a solution of THR(Bzl)Ser(Bzl)-Cys(SMBzl)OBzl · TFA salt (20 m moles) in DMF (20 ml) neutralized with triethylamine to pH 7. The mixture was cooled in an ice-bath and treated with DCC (4.5 gr) for 2 hours in the cold then for 2 days at room temperature. The DCU was filtered and the filtrate evaporated to dryness. The residue was triturated with water to give a precipitate which was taken in EtOAc, washed with 5% citric acid, water, 5% $Na_2CO_3$, water dried over $Na_2SO_4$ and evaporated to dryness. The residue was solidified from $Et_2O$-Hexane, it can be crystallized from MeOH, very soluble in $CHCl_3$. 17.3 gr (70%) m.p. 105°–107°C. $R_f$($CHCl_3$-MeOH, 10:1) 0.90 $[\alpha]_D^{25}$ −3.6 (C 1, DMF)

Anal. Calc. for $C_{64}H_{75}N_5SO_{12} \cdot H_2O$ (1156.2) C 66.46, H 6.71, N 6.05,
Found: C 66.68, H 6.59, N 6.20

EXAMPLE IX

N-tert-Butyloxycarbonyl-L-Phenylalanyl-L-Phenylalanyl-L-Tryptophy-$N^\epsilon$-Benzyloxycarbonyl-L-Lysyl-O-Benzyl-L-Threonyl-L-Phenylalanyl-L-O-Benzyl-L-Threonyl-O-Benzyl-L-Seryl-S-p-Methoxy-benzyl-L-Cysteine Benzyl Ester.

BOC-Thr(Bzl)-Phe-Thr-(Bzl)-Ser(Bzl)-Cys(SMBzl))-OBzl (11.4 gr. 10 m moles) was mixed with 200 m moles anisole (20 ml) and treated with TFA (200 ml) for 30 minutes in an ice-bath and for 30 minutes farther at room temperature, then the mixture was evaporated to dryness in high vacuo and residue triturated with an excess of dry $Et_2O$-pentane to afford a solid, 11 gr (95 %) $R_f$ ($CHCl_3$-MeOH-AcOH, 85:10:5) 0.55 trace at 0.45

The above solid (9.37 gr, 8.14 m moles) was dissolved in DMF (ca. 150 ml) and neutralized with triethylamine (1.14 ml) then mixed with BOC-Phe-Phe-Trp-Lys-(Cbz)-OH (prepared by the method of Example II) (7 gr. 8.14 m moles) and N-hydroxysuccinimide (1.035 gr) and the mixture was cooled in an ice-bath. To the cold mixture DCC (2.06 gr) was added under stirring for 2 hours in the ice-bath and for 3 days at room temperature. The DCU which separated was filtered off and the filtrate was treated with an excess of water to give a solid which was washed on the filter thoroughly with 5 percent citric acid, water, 5% $Na_2CO_3$, water and dried, 18 gr (96%). m.p. 200°–203°C. (dec.) $[\alpha]_D^{25}$ −5.6 (C 0,5, DMF) $R_f$ ($CHCl_3$-MeOH, 10:1) 0.65 $R_f$ ($CHC_3$-MeOH, 85:10:5 0.83.

Elemental Analysis for $C_{107}H_{121}N_{11}SO_{18} \cdot H_2O$ (1899)
Calcd: C 67.60, H 6.52, N 8.0
Found: C 67.31, H. 6.60, N 8.46

EXAMPLE X

L-Phenylalanyl-L-Phenylalanyl-L-Tryptophyl-$N^\epsilon$-Benzyloxycarbonyl-L-Lysyl-O-Benzyl-L-Threnoyl-L-Phenylalanyl-O-Benzyl-L-Threonyl-O-Benzyl-L-Seryl-S-p-Methoxybenzyl-L-Cysteine Benzyl Ester Trifluoroacetate.

BOC-Phe-Phe-Trp-Lys(Cbz)-Thr(Bzl)-Phe-Thr(Bzl)-Ser(Bzl)-Cys(SMBz)OBzl 3 gr. 1.6 m moles) was mixed with anisole (2 ml, ca. 32 m moles) and then an excess of TFA was added. The solution was left to stand at room temperature for 1 hour then evaporated to dryness and the residue triturated with dry Et₂O to afford a solid 2.8 gr (92percent). $R_f$ (chloroform-methanol-acetic acid, 85:10:5) 0,50, $R_f$ (chloroform-methanol, 10:1) 0.55, trace at 0.25, ninhydrin and $I_2$ positive spots.

Amino acid analysis: Thr (2) 1.97 Ser (1) 0.76 Phe (3) 3.00 Lys (1) 0.90 Trp (1) - Cys (1) - .

EXAMPLE XI

N-t-Butyloxycarbonyl-L-Asparaginyl-L-Phenylalanyl-L-Phenylalanyl-L-Tryptophyl-N$^\epsilon$-benzyloxycarbonyl-L-Lysyl-O-Bezyl-L-Threonyl-L-Phenylalanyl-O-Benzyl-L-Threonyl-O-Benzyl-L-Seryl-S-p-Methoxybenzyl-L-Cysteine Benzyl Ester.

Phe-Phe-Trp-Lys(Cbz)-Thr-Bzl)-Phe-Thr(Bzl)-Ser(Bzl)-Cys-(SMBzl)-OBzl · TFA salt (2.85 gr. 1.5 m moles) was dissolved in DMF (50 ml) and treated with triethylamine (0.2 ml) followed by BOC-Asn-ONP (881 mgr, 2.5 m moles) and one drop glacial acetic acid. The mixture was left to stand at room temperature for 5 days then the solvent was evaporated to a small volume and the residue triturated with excess water to afford a solid which was filtered washed with water on the filter and digested with methanol. 2.5 gr (84 percent) m.p. 220°–222°C. $[\alpha]_D^{25}$ −11.8 (C 0.99, DMF)

Anal. Calc. for $C_{111}H_{127}N_{13}SO_{20} \cdot H_2O$ (2013) C 66.22 H 6.46 N 9.04 Found: C 65.96 H 6.40 N 8.97

EXAMPLE XII

L-Asparginyl-L-Phenylalanyl-L-Phenylalanyl-L-Tryptophyl-N$^\epsilon$-Benzyloxycarbonyl-L-Lysyl-O-Benzyl-L-Threonyl-L-Phenylalanyl-O-Benzyl-L-Threonyl-O-Benzyl-L-Seryl-S-p-Methoxybenzyl-L-Cysteine Benzyl Ester Trifluoroacetate Salt.

BOC-Asn-Phe-Phe-Trp-Lys-(Cbzl)-Thr-(Bzl)-Phe-Thr-(Bzl)-Ser-(Bzl)-Cys-(SMBzl)OBzl (2.3 gr, 1.15 m moles) was mixed with anisole (4 ml) and treated with TFA (75 ml) for 1 hour at room temperature (in another preparation the reaction time was shortened to 30 minutes with excellent results). The excess TFA was removed in vacuo and the dark residue was triturated with dry Et₂O to give a solid, 2.2 gr (95 percent). The compound is too insoluble in the volatile solvents for thin layer chromatography.

EXAMPLE XIII

N-Tert-Butyloxycarbonyl-L-Alanyl-Glycyl-S-p-Methoxybenzyl-L-Cysteinyl-N$^\epsilon$-Benzyloxycarbonyl-L-Lysyl-L-asparaginyl-L-Phenyl-alanyl-L-Phenylalanyl-L-Trytophyl-N$^\epsilon$-Benzyloxycarbonyl-L-Lysyl-O-Benzyl-L-Threonyl-L-Phenylalanyl-O-Benzyl-L-Threonyl-O-Benzyl-L-Seryl-S-p-Methoxybenzyl-L-Cysteine Benzyl Ester.

A solution of Asn-Phe-Phe-Trp-Lys(Cbz)-Thr-(Bzl)-Phe-Thr-(Bzl)-Ser-(Bzl)-Cys(SMBzl)-OBzl. TFA salt (2.6 gr. 1.29 m moles) in DMF (ca. 100 ml) was neutralized with triethylamine (0.18 ml) and then mixed with BOC-Ala-Gly-Cys(SMBzl)-Lys-(Cbz)-OH (prepared in the method of Example 1) (1.1 gr, 1.5 m moles) and N-hydroxysuccinimide (0.23 gr).

The reaction mixture was cooled in an ice-bath and treated with DCC (0.309 gr) then stirred for 2 hours in the cold and overnight at room temperature. The DCU which separated was filtered off and the filtrate was treated with an excess of water to afford a white precipitate which was washed with 5% KHCO₃, water, 5% KHSO₄, water, then digested with methanol, washed with methanol and dried. 2.9 gr (87 percent). m.p. 246°–250°C. (dec). $[\alpha]_D^{25}$ −12.8 (C 0.99, DMF)

Anal. Calc. for $C_{141}H_{166}N_{18}S_2O_{27}$ (2608.74) C 64.91, H 6.41,
N 9.66, S. 2.45
Found: C 64.92, H 6.57,
N 9.66, S 2.67

Amino Acid Analysis: Asp (1) 1.14 Thr (2) 2.18 Ser. (1) 0.73
Gly (1) 1 Ala (1) 1.04 Phe (3) 2.95 Lys (2) 1.81.

EXAMPLE XIV

L-Alanyl-Glycyl-L-Cystinyl-L-Lysyl-L-Asparaginyl-L-Phenylalaynyl-L-Phenylalanyl-L-Tryptophyl-L-Lysyl-L-Threonyl-L-Phenylalanyl-L-Threonyl-L-Seryl-L-Cystine Triacetate Salt Pentahydrate.

BOC-Ala-Gly-Cys(SMBzl)-Lys(Cbz)-Asn-Phe-Phe-Trp-Lys-(Cbz)-Thr-(Bzl)-Phe-Thr-(Bzl)-Ser-(Bzl)--Cys(SMBzl)-OBzl (2.4 gr. 0.92 m moles) was mixed with anisole (20 ml) then treated with liquid HF (distilled over $CoF_3$ (c. a. 60 ml) for 30 minutes in an icebath and for 10 m minutes at room temperature. The excess HF was evaporated in high vacuo as fast as possible and the residue washed with dry Et₂O (flushed with hydrogen) and then taken in 5 percent acetic acid containing 5 percent mercaptoethanol and lyophilized to give a fluffy solid 1.96 gr (over 100 percent, AcOH retained).

Most of the above solid (b 1.9 gr) was mixed with 2N-AcOH containing 0.5 percent mercaptoethanol, v/v, (ca 30 ml) to give a jelly which was liquified by the addition of some brine. The solution was applied onto a Sephadex -G-25 (fine) column (2.5 × 95 cm) and eluted with 2N-AcOH. Fractions of 4.5 ml were collected and the location of the compound was achieved by measuring the absorbance (O.D.) at 278 μ of every second fraction. The fractions 92–116 were pooled and lyophilized to give a fluffy solid, 1.0 gr. $R_f$ (EtOAc-Pyridine-Water-AcOH, 5:5:3:1) 0.73 with the least streaking.

Amino Acid Analysis Asp (1) 0.91 Thr (2) 1.97 Ser (1) 0.63
Gly (1) 1.03 Ala (1) 1.02 Phe (3) Lys (2) 2.24 (Trp, Cys not determined).

A part of the above solid (100 mgr) was dissolved in a 0.1 M solution of ammonium acetate adjusted to pH 7.5 with dilute ammonia solution (ca. 1000 ml) and left to stand in the open air for 4 days by which time the pH dropped to 7.1. Lyophilization twice afforded a solid (100 mgr) which gave a negative Ellman's reaction.

This material was dissolved in a small volume of the upper phase of a mixture of n-butanol-glacial acetic acid-water (4:1:5) and applied onto a column (2.5 × 50 cm) of Sephadex G-25 (fine) equilibrated first with the lower phase of the above mixture then with the upper phase and eluted with the last one.

Fractions of 3.7 ml were collected and the fractions 55–81 were pooled and lyophilized to afford a fluffy solid, 32 mgr (32 percent). $R_f$ (n-butanol-glacial acetic acid-water) 0.28 and $R_f$ (isopropanol-1N-NH₄OH, 2:1) 0.50 , chlorox peptide spray positive spots. $[\alpha]_D^{25}$ −36°(C 0.566, 1% AcOH)

Anal, Calc. for $C_{76}H_{104}N_{18}S_2O_{19} \cdot 3CH_3CO_2H \cdot 5 H_2O$ (1907.8) C 51.60, H 6.65, N 13.21
Found C52.26, H 5.64, N 12.69

Amino Acid Analysis: Asp (1) 0.92 Thr (2) 1.80 Ser (1) 0.83 Gly(1) 0.83 Ala (1) 0.99 Phe (3) 3.17 Lys (2) 2.26 Cys (2) 1.85 determined as cysteic acid. Trp determined from UV spectrum.

A fraction of the above solid (24.5 mgr) was dissolved in 1 ml 2 N-AcOH and applied onto a column (0.9 × 84 cm) Sephadex G25(fine) and then eluted with 2N-AcOH. Fractions of 2.5 ml were collected and the compound was located by the Folin-Lowry method, one main peak with the maximum at 1.66 void volumes emerged and it was lyophilized to give 17.2 mgr (74 percent) of white fluffy solid.

$[\alpha]_D^{26}$ −35 (c. 0.5, 1% AcOH)

$R_f$-n-butanol-glacial acetic acid-water, 4:1:5) 0.28
$R_f$ (isopropanol-1N-NH$_4$OH, 2:1) 0.50 Chlorox peptide spray positive spots.

The synthetic tetradecapeptide was homogeneous on further testing by TLC in four solvent systems.

| Solvent system (volume/volume) | $R_f$* |
| --- | --- |
| N-Butanol-glacial acetic acid-water (4:1:1) | 0.20 |
| isoPropanol- 1N acetic acid (2:1) | 0.66 |
| isoPropanol- 1N ammonium hydroxide (2:1) | 0.54 |
| Ethyl acetate-pyridine-water-acetic acid (5:5:3:1) | 0.74 |

*Eastman Chromagram sheet type K 201R (silica gel)

What is claimed is:

1. A compound of the formula:

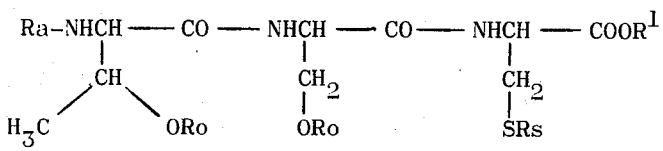

in which Ra is a member selected from the group consisting of tertiary-butyloxycarbonyl, tertiary-amyloxycarbonyl, trityl, phthalyl, tosyl, allyloxycarbonyl, cyclopentyloxycarbonyl, 2-(p-biphenylyl) isopropoxycarbonyl, diphenylmethyloxycarbonyl, ortho, para or 2,4-dinitrophenylsulfenyl, and

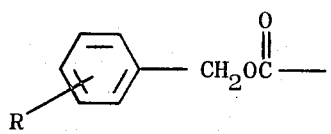

wherein R is hydrogen, halo, lower alkoxy or nitro;
Ro is a member selected from the group consisting of hydrogen, acetyl, tosyl, benzoyl, tertiary butyl, trityl, benzyl, and p-methoxybenzyl radicals;
Rs is a member selected from the group consisting of benzoyl, trityl, benzyl, p-methoxybenzyl, benzyloxycarbonyl, p-nitrobenzyl, acetamidomethyl, diphenylmethyl or nuclear substituted diphenylmethyl in which the substituents are alkoxy of 1 to 6 carbon atoms, chloro, iodo, or bromo radicals; and
$R^1$ is a member selected from the group consisting of hydrogen, lower alkyl, benzyl, p-nitrobenzyl, p-methoxybenzyl, 2,4-dimethoxybenzyl, 2,4,6-trimethylbenzyl, pentamethylbenzyl, phenacyl, phthalimidomethyl, beta-methylthioethyl, 4-picolyl and 4-(methylthio)phenyl.

2. The compound of claim 1 which is N-tert-butyloxycarbonyl-O-benzyl-L-threonyl-O-benzyl-L-seryl-S-p-methoxybenzyl-L-cysteine benzyl ester.

3. A compound of the formula:
Ra-Thr(Ro)-Phe-Thr(Ro)-Cys(SRs)-OR¹ ¹
in which Ra is a member selected from the group consisting of tertiary-butyloxycarbonyl, tertiary-amyloxycarbonyl, trityl, phthalyl, tosyl, allyloxycarbonyl, cyclopentyloxycarbonyl, 2-(p-biphenylyl)-isopropoxycarbonyl, diphenylmethyloxycarbonyl, ortho, para or 2,4-dinitrophenylsulfenyl, and

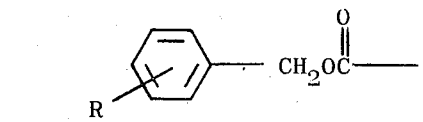

wherein R is hydrogen, halo, lower alkoxy or nitro;
Ro is a member selected from the group consisting of hydrogen, acetyl, tosyl, benzoyl, tertiary butyl, trityl, benzyl, and p-methoxybenzyl radicals;
Rs is a member selected from the group consisting of benzoyl, trityl, benzyl, p-methoxybenzyl, benzyloxycarbonyl, p-nitrobenzyl, acetamidomethyl, diphenylmethyl or nuclear substituted diphenylmethyl in which the substituents are alkoxy of 1 to 6 carbon atoms, chloro, iodo, or bromo radicals; and
$R^1$ is a member selected from the group consisting of hydrogen, lower alkyl, benzyl, p-nitrobenzyl, p-methoxybenzyl, 2,4-dimethoxybenzyl, 2,4,6-trimethylbenzyl, pentamethylbenzyl, phenacyl, phthalimidomethyl, beta-methylthioethyl, 4-picolyl and 4-(methylthio)phenyl.

4. The compound of claim 3 which is N-tert-butyloxycarbonyl-O-benzyl-L-threonyl-L-phenylalanyl-O-benzyl-L-threonyl-O-benzyl-L-seryl-S-p-methoxybenzyl-L-cysteine benzyl ester.

5. A compound of the formula:
Ra-Phe-Phe-Trp-Lys(Ra$^\epsilon$)-OR¹
in which Ra and Ra$^\epsilon$ are independently selected from the group consisting of tertiary-butyloxycarbonyl, tertiary-amyloxycarbonyl, trityl, phthalyl, tosyl, allyloxycarbonyl, cyclopentyloxycarbonyl, 2-(p-biphenyl)-isopropoxycarbonyl, diphenylmethyloxycarbonyl, ortho, para or 2,4-dinitrophenylsulfenyl, and

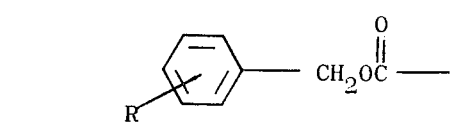

wherein R is hydrogen, halo, lower alkoxy or nitro; and
$R^1$ is a member selected from the group consisting of hydrogen, lower alkyl, diphenylmethyl, benzyl, p-nitrobenzyl, p-methoxybenzyl, 2,4-dimethoxybenzyl, 2,4,6-trimethylbenzyl, pentamethylbenzyl, phenacyl, phthalimidomethyl, beta-methylthioethyl, 4-picolyl and 4-(methylthio)phenyl.

6. The compound of claim 5 which is N-tert-butyloxy-carbonyl-L-phenylalanyl-L-phenylalanyl-L-tryptophyl-N$^\epsilon$-benzyloxycarbonyl-L-lysine methyl ester.

7. The compound of claim 5 which is N-tert-butyloxy-carbonyl-L-phenylalanyl-L-phenylalanyl-L-tryptophyl-N$^\epsilon$-benzyloxycarbonyl-L-lysine.

8. A compound of the formula:

Ra-Phe-Phe-Trp-Lys-(Ra^ε)-Thr(Ro)-Phe-
Thr(Ro)-Ser(Ro)-Cys(SRs)-OR¹ in which Ra and Ra^ε are independently selected from the group consisting of tertiary-butyloxycarbonyl, tertiary-amyloxycarbonyl, trityl, phthalyl, tosyl, allyloxycarbonyl, cyclopentyloxycarbonyl, 2-(p-biphenylyl)-isopropoxycarbonyl, diphenylmethoxycarbonyl, ortho, para or 2,4-dinitrophenylsulfenyl, and

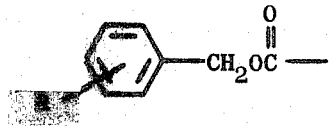

wherein R is hydrogen, halo, lower alkoxy or nitro;
Ro is a member selected from the group consisting of hydrogen, acetyl, tosyl, benzoyl, tertiary butyl, trityl, benzyl, and p-methoxybenzyl radicals;
Rs is a member selected from the group consisting of benzoyl, trityl, benzyl, p-methoxybenzyl, benzyloxycarbonyl, p-nitrobenzyl, acetamidomethyl, diphenylmethyl or nuclear substituted diphenylmethyl in which the substituents are alkoxy of 1 to 6 carbon atoms, chloro, iodo, or bromo radicals; and
R¹ is a member selected from the group consisting of hydrogen, lower alkyl, diphenylmethyl, benzyl, p-nitrobenzyl, p-methoxybenzyl, 2,4-dimethoxybenzyl, 2,4,6-trimethylbenzyl, pentamethylbenzyl, phenacyl, phthalimidomethyl, beta-methylthioethyl, 4-picolyl and 4-(methylthio)phenyl.

9. The compound of claim 8 which is N-tert-butyloxycarbonyl-L-phenylalanyl-L-phenylalanyl-L-tryptophyl-N^ε-benzyloxycarbonyl-L-lysyl-O-benzyl-L-threonyl-L-phenylalanyl-O-benzyl-L-threonyl-O-benzyl-L-seryl-S-p-methoxybenzyl-L-cysteine benzyl ester.

10. A compound of the formula Ra-Asn-Phe-Phe-Trp-Lys(Ra^ε)-Thr(Ro)-Phe-Thr(Ro)-Ser(Ro)-Cys(SRs)-OR¹ ¹
in which Ra and Ra^ε are independently selected from the group consisting of tertiary-butyloxycarbonyl, tertiary-amyloxycarbonyl, trityl, phthalyl, tosyl, allyloxycarbonyl, cyclopentyloxycarbonyl, 2-(p-biphenylyl)-isopropoxycarbonyl, diphenylmethyloxycarbonyl, ortho, para or 2,4-dinitrophenylsulfenyl, and

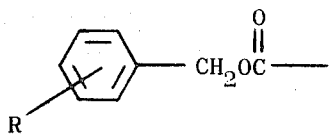

wherein R is a hydrogen, halo, lower alkoxy or nitro;
Ro is a member selected from the group consisting of hydrogen, acetyl, tosyl, benzoyl, tertiary butyl, trityl, benzyl, and p-methoxybenzyl radicals;
Rs is a member selected from the group consisting of benzoyl, trityl, benzyl, p-methoxybenzyl, benzyloxycarbonyl, p-nitrobenzyl, acetamidomethyl, diphenylmethyl or nuclear substituted diphenylmethyl in which the substituents are alkoxy of 1 to 6 carbon atoms, chloro, iodo, or bromo radicals; and
R¹ is a member selected from the group consisting of hydrogen, lower alkyl, diphenylmethyl, benzyl, p-nitrobenzyl, p-methybenzyl, 2,4-dimethoxybenzyl, 2,4,6-trimethylbenzyl, pentamethylbenzyl, phenacyl, phthal, midomethyl, beta-methylthioethyl, 4-picolyl and 4-(methylthio)phenyl.

11. The compound of claim 10 which is N-tert-butyloxycarbonyl-L-asparaginyl-L-phenylalanyl-L-phenylalanyl-L-tryptophyl-N^ε-benzyloxycarbonyl-L-lysyl-O-benzyl-L-threonyl-L-phenylalanyl-O-benzyl-L-threonyl-O-benzyl-L-seryl-S-p-methoxybenzyl-L-cysteine benzyl ester.

12. A compound of the formula:
Ra-Ala-Gly-Cys(SRs)-Lys-(Ra^ε)OR¹
in which Ra and Ra^ε are independently selected from the group consisting of tertiary-butyloxycarbonyl, tertiary-amyloxycarbonyl, trityl, phthalyl, tosyl, allyloxycarbonyl, cyclopentyloxycarbonyl, 2-(p-biphenylyl)isopropoxycarbonyl, diphenylmethyloxycarbonyl, ortho, para or 2,4-dinitrophenylsulfenyl, and

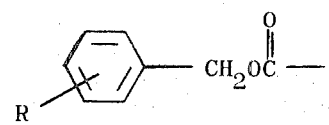

wherein R is hydrogen, halo, lower alkoxy or nitro;
Rs is a member selected from the group consisting of benzoyl, trityl, benzyl, p-methoxybenzyl, benzyloxycarbonyl, p-nitrobenzyl, acetamidomethyl, diphenylmethyl or nuclear substituted diphenylmethyl in which the substituents are alkoxy of 1 to 6 carbon atoms, chloro, iodo, and bromo radicals; and
R¹ is a member selected from the group consisting of hydrogen, lower alkyl, diphenylmethyl, benzyl, p-nitrobenzyl, p-methoxybenzyl, 2,4-dimethoxybenzyl, 2,4,6-trimethylbenzyl, pentamethylbenzyl, phenacyl, phthalimidomethyl, beta-methylthioethyl, 4-picolyl and 4-(methylthio)phenyl.

13. The compound of claim 12 which is tert-butyloxycarbonyl-L-alanylglycyl-S-p-methoxybenzyl-L-cysteinyl-N^ε-benzyloxycarbonyl-L-lysine methyl ester.

14. The compound of claim 12 which is tert-butyloxycarbonyl-L-alanylglycyl-S-p-methoxybenzyl-L-cysteinyl-N^ε-benzyloxycarbonyl-L-lysine.

15. A compound of the formula:
Ra-Ala- ly-Cys(SRs)-Lys(Ra^ε)-Asn-Phe-Phe-Trp-Lys(Ra^ε)-Thr(Ro)-Phe-Thr(Ro)-Ser(Ro)-Cys(SRs)-OR 1
in which Ra is an α-amino protecting group which is stable under deesterification conditions;
Ro is hydrogen or a hydroxyl protecting group which is stable under conditions for removal of Ra, coupling and deesterification;
Rs is a mercapto protecting group which is stable under conditions for removal of Ra, coupling and deesterification;
R¹ is a member selected from the group consisting of hydrogen and a carboxyl protecting group, which is stable under conditions for removal of Ra and coupling; and
Ra^ε is an epsilon amino protecting group which is stable under conditions for removal of Ra, coupling and deesterification.

16. A compound of the formula: Ra-Ala-Gly-Cys(SRs)-Lys(Re)-Asn-Phe-Phe-Trp-Lys(Ra^ε)-Thr-(Ro)-Phe-Thr(Ro)-Ser(Ro)-Cys(SRs)-OR¹ in which
Ra and Ra^ε are independently selected from the group consisting of tertiary-butyloxycarbonyl, tertiary-amyloxycarbonyl, trityl, phthalyl, tosyl, allyloxycarbonyl, cyclopentyloxycarbonyl, 2-(p-biphenylyl)-isopropoxycarbonyl, diphenylmethyloxycarbonyl, ortho, para or 2,4-dinitrophenylsulfenyl, and

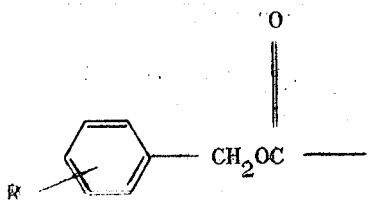 wherein

R is hydrogen, halo, lower alkoxy or nitro;
Ro is a member selected from the group consisting of acetyl, tosyl, benzoyl, tertiary butyl, trityl, benzyl, and p-methoxybenzyl radicals;
Rs is a member selected from the group consisting of benzoyl, trityl, benzyl, p-methoxybenzyl, benzyloxycarbonyl, p-nitrobenzyl, acetamidomethyl, diphenylmethyl or nuclear substituted diphenylmethyl in which the substituents are alkoxy of 1 to 6 carbon atoms, chloro, iodo, and bromo radicals; and
$R^1$ is a member selected from the group consisting of hydrogen, lower alkyl, diphenylmethyl, benzyl, p-nitrobenzyl, p-methoxybenzyl, 2,4-dimethoxybenzyl, 2,4,6-trimethylbenzyl, pentamethylbenzyl, phenacyl, phthalimidomethyl, beta-methyl-thioethyl, 4-picolyl and 3-(methylthio)phenyl.

17. The compound of claim 16 which is N-tert-butyloxycarbonyl-L-alanylglycyl-S-p-methoxybenzyl-L-cysteinyl-N$^\epsilon$-benzyloxycarbonyl-L-lysyl-L-asparaginyl-L-phenylalanyl-L-phenylalanyl-L-Ttryptophyl-N$^\epsilon$-benzyloxycarbonyl-L-lysyl-O-benzyl-L-threonyl-L-phenylalanyl-O-benzyl-L-threonyl-O-benzyl-L-seryl-S-p-methoxybenzyl-L-cysteine benzyl ester.

18. A process for the production of the tetradecapeptide somatostatin, which comprises:
a. dehydrative coupling Ra-Thr(Ro)-OH with Ser(-Ro)-ORe followed by removal of the carboxyl protecting group Re;
b. dehydrative coupling of Ra-Thr(Ro)-Ser(Ro)-OH with Cys(SRs)-ORe·HA salt followed by removal of the alpha-amino protecting group of Thr;
c. dehydrative coupling of the product of step (b) with Ra-Thr(Ro)-Phe-OH and thereafter removing the alpha-amino protecting group of Thr;
d. dehydrative coupling of the product of step (c) with Ra-Phe-Phe-Trp-Lys(Ra$^\epsilon$)-OH followed by removal of the alpha-amino protecting group of Phe;
e. coupling the product of step (d) with Ra-Asn-OR1 in the presence of a catalytic amount of an acid when R1 is a leaving group or by dehydrative coupling when R1 is hydrogen, followed by removal of the alpha-amino protecting group;
f. dehydrative coupling of the product of step (e) with Ra-Ala-Gly-Cys(SRs)-Lys(Ra$^\epsilon$)-OH to yield the fully protected tetradecapeptide Ra-Ala-Gly-Cys-(SRs)-Lys(Ra$^\epsilon$)-Asn-Phe-Phe-Trp-Lys(Ra$^\epsilon$)-Thr(Ro)-Phe-Thr(Ro)-Ser(Ro)-Cys(SRs)-ORe;
g. deprotecting the product of step (f) by acid cleavage or with sodium in liquid ammonia after removal of Ra; and
h. oxidizing the product of step (g) to obtain the cyclic disulfide;
in which
Ra is an α-amino protecting group which is stable under deesterification conditions;
Ra$^\epsilon$ is an epsilon amino protecting group which is stable under conditions for removal of Ra, coupling and deesterification;
Ro is hydrogen or a hydroxyl protecting group which is stable under conditions for removal of Ra, coupling and deesterification;
Rs is a mercapto protecting group which is stable under conditions for removal of Ra, coupling and deesterification;
Re is a carboxyl protcting group stable under conditions for removal of Ra and coupling;
R1 is a member selected from the group consisting of hydrogen and a leaving group;
and HA is an acid addition salt of cysteine.

19. The process of claim 18 in which the coupling of step (a) is performed with isobutyl chloroformate.

20. The process of claim 18 in which the dehydrative coupling of step (b) is performed with dicyclohexylcarbodiimide and N-hydroxybenzotriazole.

21. The process of claim 21 in which the dehydrative coupling of steps (c), (d) and (f) is performed with dicyclohexylcarbodiimide and N-hydroxysuccinimide.

22. The process of claim 22 in which the acid employed as a catalyst in step (e) is glacial acetic acid.

23. The process of claim 18 in which anhydrous liquid HF is employed in the acid cleavage of step (g)

24. The process of claim 18 in which the removal of alphaamino groups in steps (a), (b), (c), (d) and (e) is performed with either HBr in acetic acid, trifluoroacetic acid, or nonaqueous HCl to yield the corresponding acid addition salt.

25. A process in accordance with step (b) of claim 18 in which
Ra-Thr(Ro)-Ser(Ro)-OH is coupled with Cys(SRs)-ORe·HA salt by introduction of N-hydroxybenzotriazole and dicyclohexylcarbodiimide into a solution of the reactants in an inert organic solvent at below room temperature, wherein Ra is tert-butyloxycarbonyl, Ro is benzyl, Rs is p-methoxybenzyl, Re is benzyl and HA is p-toluene sulfonic acid, to yield N-tert-butyloxycarbonyl-O-benzyl-L-threonyl-O-benzyl-L-seryl-S-p-methoxybenzyl-L-cystaine benzyl ester.

26. A process in accordance with step (c) of claim 18 in which Thr(Ro)-Ser(Ro)-Cys(sRs)-oRe. HA salt is coupled with RaThr(Ro)-Phe-OH by dissolution in an inert organic solvent in the presence of N-hydroxysuccinimide followed by the introduction of dicyclohexylcarbodiimide at below room temperature, wherein Ra is tert-butyloxycarbonyl, Ro is benzyl, Rs is p-methoxybenzyl, Re is benzyl and HA is trifluoroacetic acid, to yield N-tert-butyloxycarbonyl-O-benzyl-L-threonyl-L-phenylalanyl-O-benzyl-L-threonyl-O-benzyl-L-seryl-S-p-methoxybenzyl-L-cysteine benzyl ester.

27. A process in accordance with step (d) of claim 18 in which the reactant Ra-Phe-Phe-Trp-Lys(Ra$^\epsilon$)-OH is prepared by the reaction of Ra-Phe-Phe-Trp-OH/with Lys(Ra$^\epsilon$)-OCH$_3$·HA by dissolution of the reactants in an inert organic solvent in the presence of N-hydroxysuccinimide at below room temperature followed by the introduction of dicyclohexylcarbodiimide, and subsequently saponifying the methyl ester and acidifying the salt, wherein Ra is tert-butyloxycarbonyl, Ra$^\epsilon$ is benzyloxycarbonyl and HA is hydrochloric acid, to yield N-tert-butyloxycarbonyl-L-phenylalanyl-L-phenylalanyl-L-tryptophyl-N$^\epsilon$-benzyloxycarbonyl-L-lysine.

28. A process in accordance with step (d) of claim 18 in which Thr(Ro)-Phe-Thr(Ro)-Ser(Ro)-Cys(SRs)-ORe·HA is coupled with Ra-Phe-Phe-Trp-Lys(Ra$^\epsilon$)-OH by dissolving the reactants in an inert organic solvent containing N-hydroxysuccinimide followed by the introduction of dicyclohexylcarbodiimide at below room temperature, wherein Ra is tert-butyloxycarbonyl, Ro is benzyl Rs is p-methoxybenzyl, Re is benzyl, Ra$^\epsilon$ is benzyloxycarbonyl and HA is trifluoroacetic acid, to yield N-tert-butyloxycarbonyl-L-phenlalanyl-L-phenylalanyl-L-tryptophyl-N$^\epsilon$-benzyloxycarbonyl-L-lysyl-O-benzyl-L-threonyl-L-phenylalanyl-O-benzyl-L-threonyl-O-benzyl-L-servyl-S-p-methoxybenzyl-L-cysteine benzyl ester.

29. A process in accordance with step (e) of claim 18 in which Phe-Phe-Trp-Lys(Ra$^\epsilon$)-Thr(Ro)-Phe-Thr(Ro)-Ser(Ro)-Cys(SRs)-O-benzyl·HA salt is coupled with Ra-Asn-OR1 by dissolving the reactants in an inert organic solvent followed by the introduction of a catalytic amount of an acid at ambient temperature, wherein Ra is tert-butyloxycarbonyl, Ro is benzyl, Rs is p-methoxybenzyl, Ra$^\epsilon$ is benzyloxycarbonyl, Rl is p-nitrophenyl and HA is trifluoroacetic acid, to yield N-tert-butyloxycarbonyl-L-asparaginyl-L-phenylalanyl-L-phenylalanyl-L-tryptophyl-N$^\epsilon$-benzyloxycarbonyl-L-lysyl-O-benzyl-L-threonyl-L-phenylalanyl-L-phenylalanyl-L-tryptophyl-N$^\epsilon$-methoxybenzyl-L-cysteine benzyl ester.

30. A process in accordance with step (f) of claim 18 in which the reactant Ra-Ala-Gly-Cys(SRs)-Lys(Ra$^\epsilon$)-OH is prepared by the coupling Ra-Ala-Gly-Cys(SRs)-OH with Lys(Ra$^\epsilon$)-ORe·HA by dissolution of the reactants in an inert organic solvent containing N-hydroxysuccinimide at below room temperature followed by the introduction of dicyclohexylcarbodiimide and subsequent saponification and acidification of the product, wherein Ra is tert-butyloxycarbonyl, Rs is p-methoxybenzyl, Re is methyl, Ra$^\epsilon$ is benzyloxycarbonyl and HA is hydrochloric acid, to yield tertbutyloxycarbonyl-L-alanylglycyl-S-p-methoxybenzyl-L-cysteinyl-N$^\epsilon$-benzyloxycarbonyl-L-lysine.

31. A process in accordance with step (f) of claim 18 in which Asn-Phe-Phe-Trp-Lys(Ra$^\epsilon$)-Thr(Ro)-Phe-Thr(Ro)-Ser(Ro)-Cys-(SRs)-Ore$^{HA}$ is coupled with Ra-Ala-Gly-Cys(SRs)-Lys(Ra$^\epsilon$)-OH by dissolution of the reactants in an inert organic solvent in the presence of N-hydroxysuccinimide followed by the introduction of dicyclohexylcarbodiimide at below room temperature, wherein Ra is tert-butyloxycarbonyl, Ro is benzyl, Rs is p-methoxybenzyl, Re is benzyl, Ra$^\epsilon$ is benzyloxycarbonyl and HA is trifluoracetic acid, to yield N-tert-butyloxycarbonyl-L-alanylglycyl-S-p-methoxy benzyl-L-cysteinyl-N$^\epsilon$-Benzyloxycarbonyl-L-lysyl-L-asparaginyl-L-phenylalanyl-L-phenylalanyl-L-tryptophyl-N$^\epsilon$-benzyloxycarbonyl-L-lysyl-O-benzyl-L-threonyl-L-phenylalanyl-O-benzyl-L-threonyl-O-benzyl-L-seryl-S-p-methoxybenzyl-L-cysteine benzyl ester.

* * * * *

UNITED STATES PATENT OFFICE
CERTIFICATE OF CORRECTION

PATENT NO. : 3,862,925
DATED : January 28, 1975
INVENTOR(S) : Dimitrios Sarantakis and Wayne A. McKinley It is certified that error appears in the above-identified patent and that said Letters Patent are hereby corrected as shown below:

Column 1, line 35, delete "IRP" and insert -- Trp --; line 44, after "Phe-" insert -- Phe- --. Column 2, line 67, delete "groups Ra" and insert -- Ra$^{\epsilon}$ --. Column 4, line 4, delete "Cys(SMBl)-OBzl O TosOH" and insert -- Cys(SMBzl)-OBzl.TosOH -- ; line 8, before "(SMBzl)" insert -- Cys -- ; line 17, before "Phe-Phe-, insert -- BOC -- ; line 18, delete "Ser(Bxl)" and insert -- Ser (Bzl) -- ; line 25, delete "Lys(Cbzl)" and insert -- Lys(Cbz)--; line 36, delete " -Obzl" and insert -- -OBzl -- .

Column 10, line 45, delete " -benzyloxycarbonyl-L-lysine."

Column 13, line 12, delete "Phenylelanyl" and insert -- Phenylalanyl -- ; line 27, delete "Heptone" and insert -- Heptane -- ; line 53, delete "Benzyloxycarbonyul" and insert -- Benzyloxycarbonyl --.

Column 14, line 38, delete "KHCO 3" and insert -- KHCO$_3$ -- ; line 39, delete "NA$_2$SO$_4$" and insert -- Na$_2$SO$_4$ --.

Column 15, line 3 delete "DME" and insert -- DMF -- .

(continued)

UNITED STATES PATENT OFFICE
CERTIFICATE OF CORRECTION

PATENT NO. : 3,862,925                                  Page 2
DATED       : January 28, 1975
INVENTOR(S) : Dimitrios Sarantakis and Wayne A. McKinley It is certified that error appears in the above-identified patent and that said Letters Patent are hereby corrected as shown below: (continued)

Column 16, line 8, delete "THR" and insert -- Thr -- ; line 63, delete "Threnoyl" and insert -- Threonyl -- ; line 67, delete "(SMBz)" and insert -- (SMBzl) -- . Column 17, line 13, delete "Bezyl" and insert -- Benzyl -- .

Column 18, line 13, delete "Cystinyl" and insert -- Cysteinyl -- ; line 14, delete "Phenylalaynyl" and insert -- Phenylalanyl --; line 16, delete "Cystine" and insert -- Cysteine -- ; line 22, delete "m" before the work "minutes"; line 29, delete "b" before "1.9 gr".

Column 19, claim 3, delete "Ra-Thr(Ro)-Phe-Thr(Ro)-Cys(SRs)-$OR^{11}$" and insert -- Ra-Thr(Ro)-Phe-Thr(Ro)-Ser(Ro)-Cys(SRs)-$OR^1$ -- .

Column 21, claim 10, line 67, delete "p-methybenzyl" and insert -- p-methoxybenzyl --; line 69, delete "phthal, midomethyl" and insert -- phthalimidomethyl --.

Column 22, claim 15, line 46, delete "Ra-Ala- ly-" and insert --Ra-Ala-Gly- --; claim 16, line 66, delete "(Re)" and insert

UNITED STATES PATENT OFFICE
CERTIFICATE OF CORRECTION

PATENT NO. : 3,862,925
DATED : January 28, 1975
INVENTOR(S) : Dimitrios Sarantakis and Wayne A. McKinley Page - 3

It is certified that error appears in the above-identified patent and that said Letters Patent are hereby corrected as shown below: (continued)

-- ($Ra^\varepsilon$) --;

Column 24, line 23, delete "protcting" and insert -- protecting --; line 33, claim 21, delete "21" and insert -- 18 --; line 36, claim 22, delete "22" and insert -- 18 --; line 57, claim 25, delete "cystaine" and insert -- cysteine --; line 60, claim 26, delete "Cys(sRs)-oRe" and insert -- Cys(SRs)-ORe --. Column 25, line 26, claim 28, delete "servyl" and insert -- seryl -- . Column 26, line 4, delete in its entirety and insert -- phenylalanyl-O-benzyl-L-threonyl-O-benzyl-L-seryl-S-p-; line 21, claim 31, delete "$Ore^{HA}$" and insert -- ORe.HA; line 16, delete "Ra" and insert $Ra^\varepsilon$ --.

Signed and Sealed this twenty-first Day of October 1975

[SEAL]

Attest:

RUTH C. MASON
Attesting Officer

C. MARSHALL DANN
Commissioner of Patents and Trademarks